United States Patent
Senoue

(10) Patent No.: US 11,075,366 B2
(45) Date of Patent: Jul. 27, 2021

(54) METHOD FOR PRODUCING SULFIDE SOLID-STATE BATTERY

(71) Applicant: Toyota Jidosha Kabushiki Kaisha, Toyota (JP)

(72) Inventor: Masaharu Senoue, Seto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/181,845

(22) Filed: Nov. 6, 2018

(65) Prior Publication Data
US 2019/0181420 A1    Jun. 13, 2019

(30) Foreign Application Priority Data

Dec. 8, 2017 (JP) .............................. JP2017-236384
Apr. 27, 2018 (JP) .............................. JP2018-087219

(51) Int. Cl.
| | | |
|---|---|---|
| *H01M 10/0562* | (2010.01) | |
| *H01M 4/04* | (2006.01) | |
| *H01M 4/36* | (2006.01) | |
| *H01M 4/38* | (2006.01) | |
| *H01M 4/485* | (2010.01) | |

(Continued)

(52) U.S. Cl.
CPC ......... *H01M 4/0404* (2013.01); *H01M 4/133* (2013.01); *H01M 4/134* (2013.01); *H01M 4/1391* (2013.01); *H01M 4/1393* (2013.01); *H01M 4/1395* (2013.01); *H01M 4/1397* (2013.01); *H01M 4/364* (2013.01); *H01M 4/386* (2013.01); *H01M 4/485* (2013.01); *H01M 4/583* (2013.01); *H01M 4/587* (2013.01); *H01M 10/052* (2013.01); *H01M 10/058* (2013.01); *H01M 10/0525* (2013.01); *H01M 10/0562* (2013.01); *H01M 10/0585* (2013.01);

(Continued)

(58) Field of Classification Search
CPC ...... H01M 8/1226; H01M 4/04; H01M 4/136; H01M 10/0585; H01M 10/0562; H01M 2004/027; H01M 4/1397; H01M 4/134; H01M 4/0404; H01M 4/6285; H01M 4/386; H01M 4/587
See application file for complete search history.

(56) References Cited

U.S. PATENT DOCUMENTS

| | | | | |
|---|---|---|---|---|
| 5,595,837 A | * | 1/1997 | Olsen ...................... | H01M 4/13 205/59 |
| 2011/0200883 A1 | * | 8/2011 | Cui ........................ | H01M 4/136 429/231.4 |

(Continued)

FOREIGN PATENT DOCUMENTS

| | | |
|---|---|---|
| JP | 2015088437 A | 5/2015 |
| JP | 2015-115194 A | 6/2015 |

(Continued)

*Primary Examiner* — Tabassom Tadayyon Eslami
(74) *Attorney, Agent, or Firm* — Dinsmore & Shohl LLP

(57) ABSTRACT

Disclosed is a sulfide solid-state battery produced via a first step of doping at least one material selected from graphite and lithium titanate with lithium, to obtain a predoped material; a second step of mixing the sulfide solid electrolyte, the silicon-based active material, and the predoped material, to obtain the anode mixture; and a third step of layering the anode mixture over the surface of the anode current collector that contains copper, to obtain the anode.

3 Claims, 3 Drawing Sheets

(51) Int. Cl.
*H01M 10/058* (2010.01)
*H01M 4/134* (2010.01)
*H01M 4/1395* (2010.01)
*H01M 4/133* (2010.01)
*H01M 4/583* (2010.01)
*H01M 10/052* (2010.01)
*H01M 4/1393* (2010.01)
*H01M 4/1397* (2010.01)
*H01M 4/1391* (2010.01)
*H01M 4/587* (2010.01)
*H01M 10/0525* (2010.01)
*H01M 10/0585* (2010.01)
*H01M 4/02* (2006.01)

(52) U.S. Cl.
CPC ............... *H01M 2004/027* (2013.01); *H01M 2300/0068* (2013.01)

(56) References Cited

U.S. PATENT DOCUMENTS

| | | | |
|---|---|---|---|
| 2015/0037688 A1* | 2/2015 | Otsuka | H01M 10/0525 429/322 |
| 2015/0171428 A1* | 6/2015 | Fujiki | H01M 10/058 429/322 |
| 2016/0197351 A1 | 7/2016 | Tani et al. | |
| 2017/0244097 A1 | 8/2017 | Ose et al. | |

FOREIGN PATENT DOCUMENTS

| | | |
|---|---|---|
| JP | 2017-054720 A | 3/2017 |
| JP | 2017-147158 A | 8/2017 |
| KR | 20150069523 A | 6/2015 |
| WO | 2014/156638 A1 | 10/2014 |

* cited by examiner

METHOD FOR PRODUCING SULFIDE SOLID-STATE BATTERY

CROSS-REFERENCE TO RELATED APPLICATIONS

The present application claims priority to Japanese Patent Application No. 2017-236384 filed on Dec. 8, 2017 and Japanese Patent Application No. 2018-087219 filed on Apr. 27, 2018, the entire contents of both of which are incorporated in the present specification by reference.

FIELD

The present application discloses a method for producing a sulfide solid-state battery.

BACKGROUND

Patent Literatures 1 to 3 disclose sulfide solid-state batteries including positive electrodes, negative electrodes, and solid electrolyte layers provided between the positive and negative electrodes. In the technique of JP 2017-054720 A (Patent Literature 1), a negative electrode mixture including a sulfide solid electrolyte, a silicon-based active material, and a carbon-based active material is layered over a surface of a negative electrode current collector formed of copper, to obtain the negative electrode. In the technique of JP 2017-147158 A (Patent Literature 2), lithium is supplied from the cathode to the anode to dope an anode active material with lithium before the sulfide solid-state battery has the use voltage at the first charge. In the technique of WO 2014/156638 A1 (Patent Literature 3), a sulfidation resistant layer is provided on a surface of an anode current collector before an anode mixture containing a sulfide solid electrolyte is layered over this surface.

SUMMARY

Technical Problem

The standard electrode potential of a sulfide solid-state battery with respect to lithium is equivalent to the OCV of an active material before charge and discharge. For example, when an anode mixture containing a silicon-based active material is layered over a surface of an anode current collector to form an anode, the standard potential of the anode with respect to lithium is approximately 2.8 V.

On the other hand, according to findings of the inventor of the present disclosure, when an anode mixture containing a sulfide solid electrolyte is layered over a surface of an anode current collector containing copper to form an anode, the sulfide solid electrolyte reacts with copper at a potential baser than 2.8 V, to form CuS having conductivity.

That is, when an anode mixture containing a silicon-based active material and a sulfide solid electrolyte is layered over a surface of an anode current collector containing copper to form an anode, the sulfide solid electrolyte reacts with copper at the OCV of the silicon-based active material, and copper diffuses from the anode current collector via the sulfide solid electrolyte toward a cathode side. Producing a sulfide solid-state battery using such an anode might lead to self-discharges caused by minor short circuits of a cathode and the anode.

Solution to Problem

The present application discloses, as one means for solving the above problem, a method for producing a sulfide solid-state battery, the method comprising: a first step of doping at least one material selected from graphite and lithium titanate with lithium, to obtain a predoped material; a second step of mixing a sulfide solid electrolyte, a silicon-based active material, and the predoped material, to obtain an anode mixture; and a third step of layering the anode mixture over a surface of an anode current collector that contains copper, to obtain an anode.

In some embodiments, a ratio (X/Y) of a converted value (X) obtained by converting a total amount of lithium with which the predoped material included in the anode mixture is being doped, into capacity, to a total capacity (Y) of the silicon-based active material contained in the anode mixture may be no less than 0.0005.

In some embodiments, in the first step, said at least one material may be doped with lithium using an electrochemical reaction in a lithium ion battery.

Advantageous Effects

In some embodiments of the present application, an anode mixture is made by mixing a predetermined predoped material together with a silicon-based active material. In some embodiments, just after the anode mixture is made, lithium diffuses from the predoped material into the silicon-based active material, which leads to a lowering potential when the anode mixture is used for an anode. That is, reaction of a sulfide solid electrolyte with copper can be suppressed, diffusion of copper from an anode current collector via the sulfide solid electrolyte toward a cathode side can be suppressed, and self-discharges caused by minor short circuits of a cathode and the anode can be suppressed. In addition, since existing in the anode and keeping its electric and/or ion conductivity, the predoped material is difficult to have bad effects on battery properties.

DETAILED DESCRIPTION OF EMBODIMENTS

1. Method for Producing Sulfide Solid-State Battery

Figure 1:
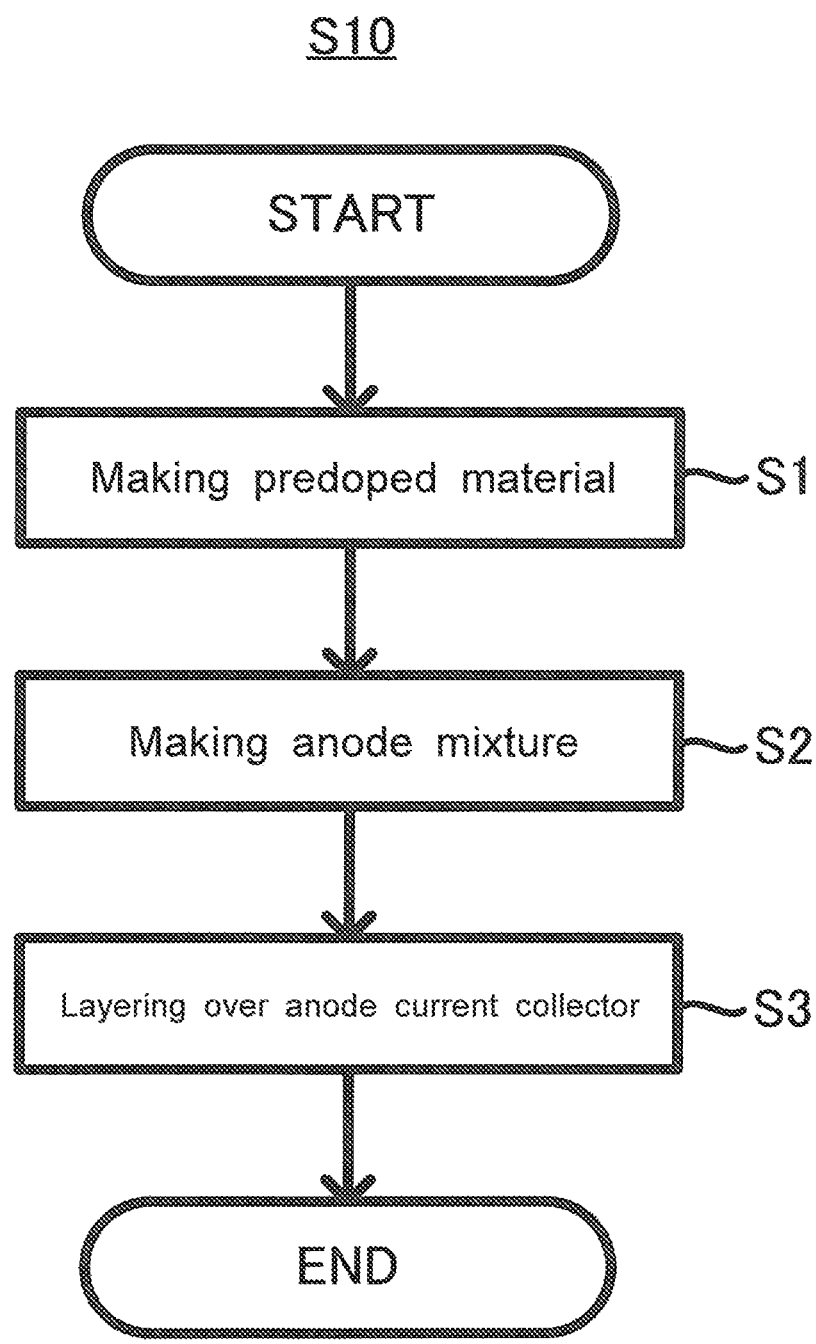
FIG. 1 is an explanatory flowchart of a method for producing a sulfide solid-state battery 100 S10.

The flow of a method for producing a sulfide solid-state battery 100 S10 will be described with reference to FIGS. 1 to 3. The method for producing the sulfide solid-state battery 100 S10 comprise: a first step S1 of doping at least one material 1 selected from graphite and lithium titanate with lithium, to obtain a predoped material 2; a second step S2 of mixing a sulfide solid electrolyte 3, a silicon-based active material 4, and the predoped material 2, to obtain an anode mixture 5; and a third step S3 of layering the anode mixture 5 over a surface of an anode current collector 6 that contains copper, to obtain an anode 10.

1.1. First Step

Figure 2A:
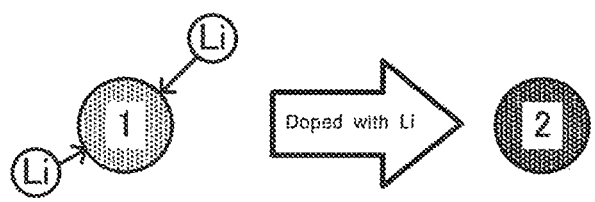
FIGS. 2A to 2C are explanatory schematic views of a flow of the method for producing the sulfide solid-state battery 100 S10.

As shown in FIG. 2A, in the first step S1, at least one material 1 selected from graphite and lithium titanate is doped with lithium, to obtain the predoped material 2.

1.1.1. Material 1

The material 1 consists of at least one selected from graphite and lithium titanate (LTO). Both graphite and lithium titanate are materials that may store and release lithium, and are known as an anode active material for a lithium ion battery. In some embodiments the anode potential of graphite is low, which makes the effect of the technique of this disclosure more outstanding. This is also because the capacity of graphite is larger. This is also because graphite may perform well as a conductive additive as well. Any of artificial graphite and natural graphite may be the material 1. The composition of lithium titanate is not specifically limited, and in some embodiments, may be $Li_4Ti_5O_{12}$. The shape of the material 1 is not specifically limited. The material 1 may be in the form of a particle.

1.1.2. Way of Doping Material with Lithium

Any way may be employed for doping the material 1 with lithium to obtain the predoped material 2. Examples thereof include a way of physically mixing the material 1 and a lithium source to dope the material 1 with lithium, and a way of electrochemically inserting lithium into the material 1. From the viewpoint that the doping amount of lithium in the material 1 can be easily controlled, the material 1 may be doped with lithium using an electrochemical reaction in a lithium ion battery. In some embodiments, one may combine the material 1, a cathode active material that charges and discharges lithium ions at a potential nobler than the material 1, and some electrolyte having lithium ion conductivity, to form a lithium ion battery, and dope the material 1 with lithium using a charge reaction in the lithium ion battery. The lithium ion battery used may be a battery of a solution system, and may be a solid-state battery. Specifically, from the viewpoint that the predoped material 2 can be easily separated after the material 1 is doped with lithium, a battery of a solution system (battery of a nonaqueous electrolyte solution system or an aqueous battery) may be used. That is, in some embodiments, one may combine the material 1, a cathode active material that charges and discharges lithium ions at a potential nobler than the material 1, an electrolyte having lithium ion conductivity (such as $LiPF_6$), and solvent for dissolving the electrolyte (water or an organic solvent) to form a lithium ion battery of a solution system, and dope the material 1 with lithium using a charge reaction in the lithium ion battery. After the material 1 is doped with lithium using an electrochemical reaction in the lithium ion battery, for example, the lithium ion battery is disassembled to strip off the predoped material 2, and the predoped material 2 is washed and ground if necessary.

The doping amount of lithium in the material 1 is not specifically limited. It is believed that as the doping amount of lithium in the material 1 is increased, the amount of the predoped material 2 in the anode mixture 5 described later can be reduced. In some embodiments, when the material 1 is doped with lithium using a charge reaction in the lithium ion battery, the material 1 may be doped with lithium until the charged capacity is no less than 10 mAh/g, in other embodiments no less than 50 mAh/g, in other embodiments no less than 80 mAh/g, and in other embodiments no less than 100 mAh/g. In some embodiments, the upper limit is not specifically limited, and may be no more than 200 mAh/g, in other embodiments no more than 180 mAh/g, and in other embodiments no more than 150 mAh/g. In some embodiments, when the material 1 is doped with lithium using a charge reaction in the lithium ion battery, the battery may be charged until the SOC is no less than 5%, in other embodiments no less than 8%, and in other embodiments no less than 10%. In some embodiments, the upper limit is not specifically limited, and may be no more than 50%.

1.2. Second Step

Figure 2B:
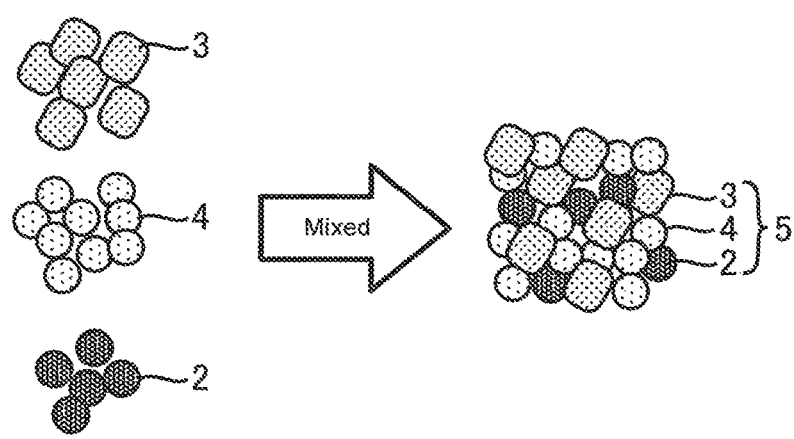

As shown in FIG. 2B, in the second step S2, the sulfide solid electrolyte 3, the silicon-based active material 4, and the predoped material 2 are mixed, to obtain the anode mixture 5.

1.2.1. Sulfide Solid Electrolyte 3

Any sulfide used for a solid electrolyte for a sulfide solid-state battery can be employed for the sulfide solid electrolyte 3. Examples thereof include $Li_2S$—$P_2S_5$, $Li_2S$—$SiS_2$, $LiI$—$Li_2S$—$SiS_2$, $LiI$—$Si_2S$—$P_2S_5$, $LiI$—$LiBr$—$Li_2S$—$P_2S_5$, $LiI$—$Li_2S$—$P_2S_5$, $LiI$—$Li_2O$—$Li_2S$—$P_2S_5$, $LiI$—$Li_2S$—$P_2O_5$, $LiI$—$Li_3PO_4$—$P_2S_5$, and $Li_2S$—$P_2S_5$—$GeS_2$. One sulfide solid electrolyte may be used alone, or at least two sulfide solid electrolytes may be mixed to be used as the sulfide solid electrolyte 3. In the second step S2, the amount of the sulfide solid electrolyte 3 is not specifically limited, and may be properly determined according to the performance of the battery to be aimed. In some embodiments, the content of the sulfide solid electrolyte 3 may be 10 mass % to 60 mass % if the whole of the anode mixture 5 (the whole of the solid content after drying to remove solvent in the case of a wet mixing; hereinafter the same) is 100 mass %. In some embodiments, the lower limit may be no less than 20 mass %, and the upper limit may be no more than 50 mass %.

1.2.2. Silicon-Based Active Material 4

The silicon-based active material 4 has only to contain Si as a constituent element, and to function as an anode active material in the sulfide solid-state battery. For example, at least one of Si, a Si alloy, and a silicon oxide may be used. The shape of the silicon-based active material 4 is not specifically limited, and in some embodiments, the silicon-based active material 4 may be in the form of a particle. In the second step S2, the amount of the silicon-based active material 4 is not specifically limited, and may be properly determined according to the performance of the battery to be aimed. In some embodiments, the content of the silicon-based active material 4 may be 30 mass % to 90 mass % if the whole of the anode mixture 5 is 100 mass %. In some embodiments, the lower limit may be no less than 50 mass %, and the upper limit may be no more than 80 mass %.

1.2.3. Predoped Material 2

In the second step S2, the amount of the predoped material 2 is not specifically limited, and may be properly determined according to the doping amount of lithium in the first step S1 etc. In some embodiments, in the second step S2, the mixing ratio of the predoped material 2 and the silicon-based active material 4 may be determined so that the ratio (X/Y) of the converted value (X) obtained by converting the total amount of lithium with which the predoped material 2 included in the anode mixture 5 is being doped, into capacity, to the total capacity (Y) of the silicon-based active material 4 contained in the anode mixture 5 is no less than 0.0005. In some embodiments, the ratio (X/Y) is no less than 0.0008. According to findings of the inventor of the present application, the ratio (X/Y) of no less than 0.0005 can lead to diffusion of a sufficient amount of lithium into the silicon-based active material 4, which makes it possible to further suppress self-discharges when the sulfide solid-state battery 100 is made.

"Converted value (X) obtained by converting the total amount of lithium with which the predoped material 2 included in the anode mixture 5 is being doped" is a value obtained by converting the total amount of lithium that may diffuse from the predoped material 2 into the silicon-based active material 4 in the anode mixture 5 into capacity. When the material 1 is doped with lithium using a charge reaction in the lithium ion battery to obtain the predoped material 2, the converted value (X) can be obtained from the charged capacity (Ah/g). "Total capacity (Y) of the silicon-based active material 4 contained in the anode mixture 5" is a capacity that the silicon-based active material 4 contained in the anode mixture 5, which is under an uncharged state, has. Specifically, Y can be a charge capacity of an active material which is obtained from the initial charge capacity obtained when a separately prepared mixture for measuring Y is charged and discharged in a cell using a Li counter electrode.

1.2.4. Other Constituents

In the second step S2, in some embodiments, a conductive additive may be further mixed in the anode mixture 5 as far as the problem can be solved. Any one known as a conductive additive employed for a sulfide solid-state battery can be employed. Examples thereof include a carbon material such as acetylene black (AB), Ketjen black (KB), a vapor grown carbon fiber (VGCF), carbon nanotubes (CNT), a carbon nanofiber (CNF), and graphite; and a metallic material such as nickel, aluminum, and stainless steel. One conductive additive may be used individually, or two or more conductive additives may be mixed to be used. Any shape such as powder and fiber can be employed for the shape of the conductive additive. In the second step S2, the amount of the conductive additive is not specifically limited, and may be properly determined according to the performance of the battery to be aimed. In some embodiments, the content of the conductive additive may be 0.5 mass % to 20 mass % if the whole of the solid content of the anode mixture 5 is 100 mass %. In some embodiments, the lower limit may be no less than 1 mass %, and the upper limit may be no more than 10 mass %.

In the second step S2, in some embodiments, binder may be further mixed in the anode mixture 5 as far as the problem can be solved. Any known one as binder employed for a sulfide solid-state battery can be employed. For example, at least one selected from styrene-butadiene rubber (SBR), carboxymethyl cellulose (CMC), acrylonitrile-butadiene rubber (ABR), butadiene rubber (BR), polyvinylidene fluoride (PVDF), polytetrafluoroethylene (PTFE), etc. can be used. In the second step S2, the amount of the binder is not specifically limited, and may be properly determined according to the performance of the battery to be aimed. In some embodiments, the content of the binder may be 1 mass % to 30 mass % if the whole of the solid content of the anode mixture 5 is 100 mass %. In some embodiments, the lower limit may be no less than 2 mass %, and the upper limit may be no more than 15 mass %.

In the second step S2, a solid electrolyte other than the sulfide solid electrolyte 3 may be further mixed in the anode mixture 5 as far as the problem can be solved. Examples thereof include an oxide solid electrolyte such as lithium lanthanum zirconate, LiPON, $Li_{1+x}Al_xGe_{2-x}(PO_4)_3$, Li—SiO-based glass, and Li—Al—S—O-based glass.

In the second step S2, in some embodiments, an anode active material other than the silicon-based active material 4 may be further mixed in the anode mixture 5 as far as the problem can be solved. Examples thereof include a carbon material such as graphite and hard carbon; various oxides such as lithium titanate; and lithium metal or a lithium alloy.

1.2.5. Mixing Way

In the second step S2, the way of mixing the sulfide solid electrolyte 3, the silicon-based active material 4, and the predoped material 2 to form the anode mixture 5 is not specifically limited. The second step S2 can be performed using a known mixing means. The mixing in the second step S2 may be wet mixing using solvent, or dry mixing without solvent (mixing granular materials with each other). Wet mixing using solvents may allow the materials to be mixed more uniformly, and lithium to diffuse more properly from the predoped material 2 into the silicon-based active material 4. In some embodiments, one may mix the sulfide solid electrolyte 3, the silicon-based active material 4, and the predoped material 2 together with solvent, to obtain the anode mixture 5 in the form of slurry or paste. Solvent used in this case is not specifically limited. Examples thereof include butyl butyrate and N-methylpyrrolidone (NMP).

1.3. Third Step

Figure 2C:
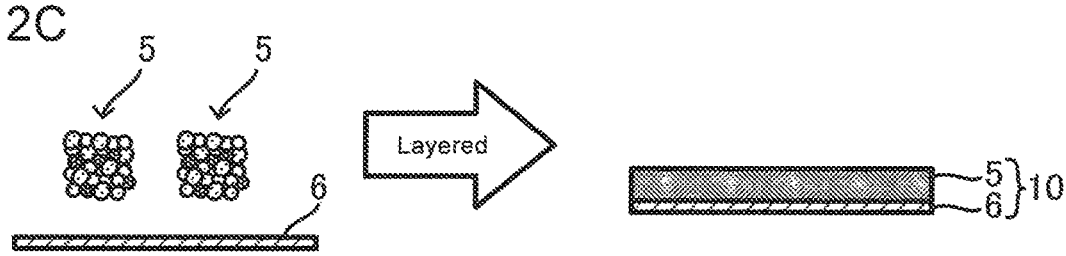

As shown in FIG. 2C, in the third step S3, the anode mixture 5 is layered over the surface of the anode current collector 6 that contains copper, to obtain the anode 10.

1.3.1. Anode Current Collector 6 Containing Copper

The anode current collector 6 may contain copper. Examples thereof include metal foil and a metal mesh which contain copper or a copper alloy. In some embodiments, the anode current collector 6 may be one whose base material is plated with copper or a copper alloy, or on a base material of which copper or a copper alloy is deposited. In some embodiments, the metal foil may be formed of copper (copper foil). The thickness of the anode current collector 6 is not specifically limited, and for example, may be 0.1 μm to 1 mm, and may be 1 μm to 100 μm.

1.3.2. Layering Way

The way of layering the anode mixture 5 over the surface of the anode current collector 6 is not specifically restricted. One may apply the anode mixture 5 to the surface of the anode current collector 6 in a wet process, and dry and optionally press-mold the collector 6, to layer the anode mixture 5 over the surface of the anode current collector 6. One may also press-mold the anode mixture 5 together with the anode current collector 6 in a dry process, to form the anode mixture 5 over the surface of the anode current collector 6. In the case of a wet process, in some embodiments, the anode mixture 5 is dispersed over solvent or the like, to be slurry or paste as described above. Not intending to be bound by any theory, it is believed that press-molding in the third step S3 leads to better contact among the sulfide solid electrolyte 3, the silicon-based active material 4, and the predoped material 2 in the anode mixture 5, which makes it possible to diffuse lithium more uniformly from the predoped material 2 into the silicon-based active material 4, and to exert a more outstanding effect.

The thickness of the layer of the anode mixture 5 that is layered over the surface of the anode current collector 6 via the third step S3 (thickness after drying to remove solvent in the case of a wet process) is not specifically limited, and in some embodiments, may be 0.1 μm to 1 mm, and may be 1 μm to 100 μm. In some embodiments, the thickness can be thicker than this for improving capacity. The thickness of the layer of the anode mixture 5 may be determined so that the capacity of the anode 10 is larger than that of a cathode 20.

As described above, the anode 10 of the sulfide solid-state battery 100 can be produced via the steps S1 to S3. In the anode 10, a layer of an anode mixture that is different from the anode mixture 5 may be further provided over a face of the layer of the anode mixture 5 which is on the opposite side of the anode current collector 6 (face on a cathode side if the anode 10 is used in the battery). Examples thereof include layers containing only an active material other than a silicon-based active material (such as a carbon based active material) as an anode active material.

1.4. Addition

Figure 3:
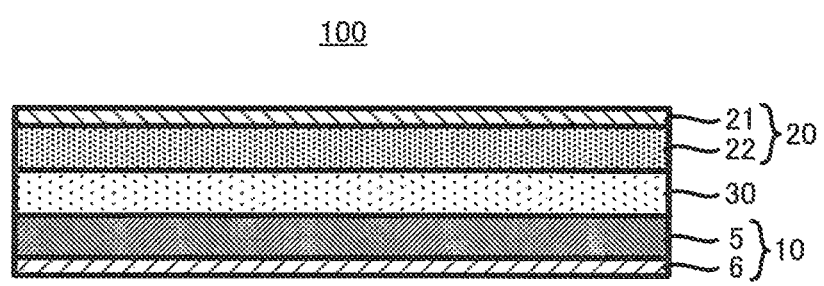
FIG. 3 is an explanatory schematic view of structure of the sulfide solid-state battery 100.

As shown in FIG. 3, the sulfide solid-state battery 100 includes the cathode 20 and a solid electrolyte layer 30 in addition to the anode 10 produced according to the steps S1 to S3. Methods for producing the cathode 20 and the solid electrolyte layer 30 are publicly known. That is, the sulfide solid-state battery 100 can be produced by the same method as one known except that the method includes the producing method S10.

1.4.1. Cathode 20

Although the structure of the cathode 20 in the sulfide solid-state battery 100 is obvious for the person skilled in the art, hereinafter an example thereof will be described. The cathode 20 usually includes a cathode active material, and a cathode mixture layer 22 that contains, as optional constituents, a solid electrolyte, binder, a conductive additive, and other additives (thickener etc.). A cathode current collector 21 that is in contact with the cathode mixture layer 22 may be included.

The cathode current collector 21 may be formed of metal foil, a metal mesh, or the like. Examples of metal that may constitute the cathode current collector include stainless steel, nickel, chromium, gold, platinum, aluminum, iron, titanium, zinc, etc. The cathode current collector 21 may be also metal foil which, or whose base material is plated with such metal or on which, or on the base material of which such metal is deposited.

Any known cathode active material for a sulfide solid-state battery can be employed for the cathode active material contained in the cathode mixture layer 22. Among known active materials, a material displaying a nobler charge and discharge potential than that of the silicon-based active material 4 may be used as the cathode active material. Examples thereof include a lithium containing oxide such as lithium cobaltate, lithium nickelate, $Li(Ni,Mn,Co)O_2(Li_{1+\alpha}Ni_{1/3}Mn_{1/3}Co_{1/3}O_2)$, lithium manganate, a spinel lithium composite oxide, lithium titanate, and a lithium metal phosphate ($LiMPO_4$ where M is at least one selected from Fe, Mn, Co and Ni). One cathode active material may be used alone, or two or more cathode active materials may be mixed to be used. The cathode active material may have a coating layer of lithium niobate, lithium titanate, lithium phosphate, or the like over the surface thereof. The shape of the cathode active material is not specifically limited, and in some embodiments, the cathode active material may be in the form of a particle or a thin film. The content of the cathode active material in the cathode mixture layer is not specifically limited, and may be equivalent to the amount of a cathode active material contained in a cathode mixture layer of a sulfide solid-state battery.

Any known solid electrolyte for a sulfide solid-state battery can be employed. Examples thereof include a sulfide solid electrolyte as described above. An inorganic solid electrolyte other than a sulfide solid electrolyte may be contained in addition to the sulfide solid electrolyte as far as a desired effect can be brought about. The same ones as in the anode 10 may be employed for the conductive additive and the binder as well. One solid electrolyte (conductive additive, binder) may be used alone, or two or more solid electrolytes (conductive additives, binders) may be mixed to be used. The shapes of the solid electrolyte and the conductive additive are not specifically limited, and in some embodiments, they may be in the form of a particle. The contents of the solid electrolyte, the conductive additive, and the binder in the cathode mixture layer are not specifically limited, and may be equivalent to those of a solid electrolyte, a conductive additive, and binder in a cathode mixture layer of a sulfide solid-state battery.

The cathode 20 having the structure described above can be easily produced by passing through steps such as putting the cathode active material, and the solid electrolyte, the binder, and the conductive additive which are optionally contained, into solvent, kneading them to obtain a slurry electrode composition, thereafter applying this electrode composition to a surface of the cathode current collector, and drying the surface. The cathode can be produced by not only such a wet process, but also a dry process. When the cathode mixture layer in the form of a sheet is formed over the surface of the cathode current collector as described above, the thickness of the cathode mixture layer may be, in some embodiments, 0.1 μm to 1 mm, and may be 1 μm to 100 μm.

1.4.2. Solid Electrolyte Layer 30

While the structure of the solid electrolyte layer 30 in the sulfide solid-state battery 100 is obvious for the person skilled in the art, hereinafter one example will be described. The solid electrolyte layer 30 contains a solid electrolyte, and optionally binder. In some embodiments, a sulfide solid electrolyte as described above may be employed for the solid electrolyte. In some embodiments, an inorganic solid electrolyte other than a sulfide solid electrolyte may be contained in addition to the sulfide solid electrolyte as far as a desired effect can be brought about. The binder same as described above may be properly selected to be used. The contents of the constituents in the solid electrolyte layer 30 may be the same as in a conventional one. The shape of the solid electrolyte layer 30 may be the same as a conventional one as well. In some embodiments, the solid electrolyte layer 30 may be in the form of a sheet. The solid electrolyte layer 30 in the form of a sheet can be easily produced by passing through steps such as putting the solid electrolyte, and optionally the binder into solvent, kneading them to obtain a slurry electrolyte composition, thereafter applying this electrolyte composition to a surface of a base material or to (a) surface(s) of the cathode mixture layer and/or the anode mixture layer, and drying the surface(s). casein some embodiments, the thickness of the solid electrolyte layer 30 may be 0.1 μm to 300 μm, and may be 0.1 μm to 100 μm.

1.4.3. Other Members

Needless to say, the sulfide solid-state battery 100 may include terminals, battery case, etc. in addition to the anode 10, the cathode 20, and the solid electrolyte layer 30. These members are publicly known, and detailed description thereof is omitted here.

1.5. Sulfide Solid-State Battery 100

In some embodiments, the sulfide solid-state battery 100 that may be produced via the producing method S10 of this disclosure has a structural feature as follows: that is, the sulfide solid-state battery 100 includes the anode 10, the cathode 20, and the solid electrolyte layer 30 provided between the anode 10 and the cathode 20, wherein the anode 10 includes a layer formed of the anode current collector 6 containing copper, and the anode mixture 5 provided over the surface of the anode current collector 6, the anode mixture 5 contains the sulfide solid electrolyte 3, the silicon-based active material 4, and the predoped material 2, and the predoped material 2 is obtained by doping the material 1, which is at least one selected from graphite and lithium titanate with lithium. The structures of the members are as described above, and detailed description thereof is omitted here.

As described above, in the producing method S10 of this disclosure, the predetermined predoped material 2 is prepared in the first step S1, and the predoped material 2 is mixed together with the silicon-based active material 4 to make the anode mixture 5 in the second step S2. casein some embodiments, just after the anode mixture 5 is made, lithium diffuses from the predoped material 2 into the silicon-based active material 4, which leads to a lowering standard potential with respect to lithium if the mixture 5 is used for the anode 10. That is, reaction of the sulfide solid electrolyte 3 with copper (copper in the anode current collector 6) can be suppressed, diffusion of copper from the anode current collector 6 via the sulfide solid electrolyte 3 toward the cathode 20 side can be suppressed, and self-discharges caused by minor short circuits of the cathode 20 and the anode 10 etc. can be suppressed in the sulfide solid-state battery 100. In addition, since existing in the anode 10 as keeping its electronic and/or ion conductivity, the predoped material 2 is difficult to have bad effects on properties of the sulfide solid-state battery 100.

2. Addition to Advantage in Producing Method of this Disclosure

The same effect seems to be obtained by doping a silicon-based active material used as an anode active material with lithium in advance using an electrochemical reaction in a lithium ion battery before an anode mixture is made. However, this is believed to be unrealistic because of costs; for example, in this case, a much larger amount of an active material has to be doped than that in the producing method S10.

The problem of formation of CuS may be solved by using an anode current collector that is formed of metal other than copper. However, in this case, some properties of a battery including cycle characteristics etc. might deteriorate.

3. Evidence on Market

For example, it can be confirmed by the following way whether a sulfide solid-state battery is produced by the producing method of this disclosure or not. That is, it can be confirmed whether a sulfide solid-state battery is produced by the producing method of this disclosure or not by, in a sulfide solid-state battery, analyzing part of an anode active material which does not face a cathode or an anode, or checking balance of cathode and anode potentials in a three electrode cell. Or, when a predoped material is obtained using an electrochemical reaction in a battery of a solution system, a SEI is formed over a surface of the predoped material. Thus, it can be confirmed whether a sulfide solid-state battery is produced by the producing method of this disclosure or not as well by confirming whether graphite or lithium titanate contained in an anode has a SEI over its surface or not. Examples of compounds that may constitute a SEI include LiF, $LiCO_3$, and a phosphate ester. Examples of the way of confirming the presence or not of compounds that may constitute a SEI include elemental analysis using TEM-EELS, ICP, and EPS, mass spectrometry using TOF-SIMS, and analysis of the combination thereof. For example, whether this embodiment is performed or not can be determined by confirming that an element such as fluorine, which is not contained in raw materials of a solid electrolyte, is only contained in a SEI that is formed over a surface of a predoped material.

EXAMPLES

Example 1

1. Making Sulfide Solid-State Battery
1.1. Making Cathode Active Material $LiNi_{1/3}Mn_{1/3}Co_{1/3}O_2$ particles (mean particle size ($D_{50}$): 6 μm) were prepared. $LiNbO_3$ was coated over surfaces of the particles by the sol-gel process. Specifically, an ethanol solution that dissolved equimolar $LiOC_2H_5$ and $Nb(OC_2H_5)_5$ was coated over the surfaces of the particles under an atmospheric pressure using a tumbling fluidized coating machine (SFP-01 manufactured by Powrex Corporation). The processing time was adjusted so that the thickness of this coating was 5 nm. Thereafter, the coated particles were heat-treated at 350° C. under an atmospheric pressure for 1 hour, to obtain a cathode active material.

1.2. Making Cathode

The obtained cathode active material, and a sulfide solid electrolyte ($LiI—Li_2O—Li_2S—P_2S_5$, mean particle size ($D_{50}$): 2.5 μm) were weighed so that their mass ratio was: cathode active material:sulfide solid electrolyte=75:25. Further, to 100 parts by mass of the cathode active material, 4 parts by mass of a PVDF based binder (manufactured by Kureha Corporation) and 6 parts by mass of acetylene black as a conductive additive were weighed. They were prepared in butyl butyrate so that the solid content was 70 mass %, and were kneaded with a stirrer, to obtain a cathode paste. Aluminum foil of 15 μm in thickness was coated with the obtained cathode paste according to a blade coating method using an applicator so that the weight of the paste was 30 $mg/cm^2$, and the foil was dried at 120° C. for 3 minutes, to obtain a cathode including a cathode mixture layer over the aluminum foil.

1.3. Making Solid Electrolyte Layer

In a heptane solvent, 95 parts by mass of the sulfide solid electrolyte same as above, and 5 parts by mass of butylene rubber as binder, which were weighed, were prepared so that the solid content was 70 mass %. They were stirred with an ultrasonic dispersive device (UH-50 manufactured by SMT Corporation) for 2 minutes, to obtain a solid electrolyte paste. A base material (aluminum foil) was coated with the obtained solid electrolyte paste in the same way as in the case of the cathode paste so that the weight of the paste was 60 $mg/cm^2$, and the base material was air-dried, and thereafter was dried at 100° C. for 30 minutes, to obtain the base material including a solid electrolyte layer.

1.4. Making Anode
1.4.1. Making Predoped Material

In ion-exchange water, 99.7 parts by mass of fine particles of natural graphite (mean particle size ($D_{50}$): 15 μm) and 0.3 parts by mass of carboxymethyl cellulose, which were weighed, were prepared so that the solid content was 60 mass %, and were kneaded by means of a planetary mixer, to obtain paste. The obtained paste was uniformly applied to copper foil according to a blade coating method, and the copper foil was dried at 120° C. for 5 minutes, to obtain an electrode. The obtained electrode was punched out to have 16 mm in diameter, to make a coin cell using metal Li as a counter electrode, a separator of PE having 20 μm in thickness as a separator, and a nonaqueous electrolyte solution (mixed solvent of EC and DEC (EC:DEC=1:1) which dissolved 1 mol/kg of $LiPF_6$ in concentration) as an electrolyte solution. This coin cell was charged by means of a charge and discharge device. The charged capacity was adjusted so as to be 100 mAh/kg to the total weight of graphite contained in the coin cell. After the charge, the coin cell was disassembled under an argon atmosphere and the electrode was taken out. After the electrode was washed with EMC, graphite was stripped off from the copper foil by means of a spatula, to obtain a predoped material.

1.4.2. Making Anode Mixture and Layering Anode Mixture Over Copper Foil

The sulfide solid electrolyte as described above, fine particles of silicon (mean particle size ($D_{50}$): 6 μm), and the predoped material were weighed so as to have the mass ratio of sulfide solid electrolyte:fine particles of silicon:predoped material=45:53.4:1.6 (silicon-based active material:predoped material=97:3). Further, to 100 parts by mass of the fine particles of silicon, 6 parts by mass of a PVDF-based binder (manufactured by Kureha Corporation) and 6 parts by mass of acetylene black as a conductive additive were weighed. They were prepared in butyl butyrate so that the solid content was 70 mass %, and were kneaded with a stirrer, to obtain a pasty anode mixture. Copper foil of 15 μm in thickness was uniformly coated with the obtained paste according to a blade coating method using an applicator, and the copper foil was dried at 120° C. for 3 minutes, to obtain an anode including an anode mixture layer over the copper foil.

1.5. Layering Cathode, Solid Electrolyte Layer, and Anode

The above described solid electrolyte layer was punched out to have 1 cm² in area, to be pressed at 1 ton/cm². The cathode was piled on one face of the pressed solid electrolyte layer (face on the opposite side of the base material), to be pressed at 1 ton/cm². The base material was stripped off. The anode was piled on the stripped face, to be pressed at 6 ton/cm², to obtain a laminate formed of: cathode/solid electrolyte layer/anode. The obtained laminate was hermetically shut up in an aluminum laminated film having terminals, to obtain a sulfide solid-state battery for evaluation. The specifications of the obtained battery are shown in the following Table 1.

2. Self-Discharge Testing on Sulfide Solid-State Battery

As described above, there is a case where reaction of copper foil that is an anode current collector with a sulfide solid electrolyte leads to formation of CuS having high conductivity, Cu diffuses from the anode current collector toward a cathode side, minor short circuits of a cathode and an anode are caused, and the voltage of a sulfide solid-state battery autogenously lowers. In order to evaluate this, the sulfide solid-state battery was subjected to self-discharge testing by the following procedures. That is, first, after the sulfide solid-state battery was charged (charge conditions: 4.4 V cccv, current rate 2 mA, cutoff current 0.1 mA), the battery was allowed to stand in a constant temperature oven at 25° C. for 25 hours, and the voltage (A V) during the standing was measured. The results are shown in the following Table 1.

3. Evaluation of Cycle Characteristics

It is expected that when a carbon-based active material is used together with a silicon-based active material, the rate of expansion as a whole of an anode active material is eased and cycle characteristics of a sulfide solid-state battery are improved in charge/discharge, compared to the case where only a silicon-based active material is used as an anode active material. In order to confirm this effect, cycle testing was carried out under the following conditions. Calculation was carried out using a discharge capacity after the 150th cycle to the first discharge capacity as a capacity retention (%). This cycle testing was carried out as the battery was constrained by means of a constraint jig with a load cell so that a pressure of 5 MPa was uniformly applied to faces of the anode and the cathode. The result is shown in the following Table 1.

(Conditions for Cycle Testing)

charge: 4.4 V cccv, current rate 10 mA, cutoff current 0.5 mA discharge: 3.0 V cc, current rate 10 mA temperature: 25° C.

Examples 2 to 4 and Comparative Example 1

A sulfide solid-state battery was made and subjected to self-discharge testing and evaluation of cycle characteristics in the same manner as in Example 1 except that the mixing ratio of the anode active material and the predoped material was changed as in the following Table 1. The specifications of the battery, and the results of the self-discharge testing and evaluation of cycle characteristics are shown in the following Table 1.

Example 5

A sulfide solid-state battery was made and subjected to self-discharge testing and evaluation of cycle characteristics in the same manner as in Example 1 except that the charged capacity when the predoped material was made was changed to 150 mAh/g. The specifications of the battery, and the results of the self-discharge testing and evaluation of cycle characteristics are shown in the following Table 1.

Example 6

A sulfide solid-state battery was made and subjected to self-discharge testing and evaluation of cycle characteristics in the same manner as in Example 1 except that the material used for the predoped material was changed from graphite to lithium titanate (mean particle size ($D_{50}$): 2 μm), to obtain the predoped material by the following procedures. The specifications of the battery, and the results of the self-discharge testing and evaluation of cycle characteristics are shown in the following Table 1.

In NMP, 92 parts by mass of lithium titanate, 3 parts by mass of a PVDF-based binder, and 5 parts by mass of acetylene black, which were weighed, were prepared so that the solid content was 70 mass %, and were kneaded by means of a planetary mixer, to obtain paste. The obtained paste was applied to copper foil according to a blade coating method, and the copper foil was dried to obtain an electrode in the same manner as in Example 1. A coin cell was made using the obtained electrode in the same manner as in Example 1. The coin cell was charged in the same manner as in Example 5 (charged capacity: 150 mAh/g). After the coin cell was disassembled and stripping off from the copper foil was performed as in the same manner in Example 1, the stripped powder was dispersed into NMP of a volume approximately 10 times as large as the powder and subjected to centrifugation repeatedly three times to remove the PVDF-based binder etc. attached to lithium titanate. Fine particles obtained after the centrifugation were used as the predoped material.

Example 7

A sulfide solid-state battery was made and subjected to self-discharge testing and evaluation of cycle characteristics in the same manner as in Example 1 except that silicon was changed to a silicon oxide (mean particle size ($D_{50}$): 5 μm), and the weight of the obtained paste in the anode was changed. The specifications of the battery, and the results of the self-discharge testing and evaluation of cycle characteristics are shown in the following Table 1.

Example 8

A sulfide solid-state battery was made and subjected to self-discharge testing and evaluation of cycle characteristics in the same manner as in Example 1 except that the charged capacity when the predoped material was made was changed to 10 mAh/g, and the mixing ratio of the anode active material and the predoped material was changed as in the following Table 1. The specifications of the battery, and the results of the self-discharge testing and evaluation of cycle characteristics are shown in the following Table 1.

Comparative Example 2

A sulfide solid-state battery was made and subjected to self-discharge testing and evaluation of cycle characteristics in the same manner as in Comparative Example 1 except that stainless steel foil of the same thickness was used as the anode current collector instead of copper foil. The specifications of the battery, and the results of the self-discharge testing and evaluation of cycle characteristics are shown in the following Table 1.

Reference Example 1

A sulfide solid-state battery was made and subjected to self-discharge testing and evaluation of cycle characteristics in the same manner as in Example 1 except that stainless steel foil of the same thickness was used as the anode current collector instead of copper foil. The specifications of the battery, and the results of the self-discharge testing and evaluation of cycle characteristics are shown in the following Table 1.

active material and the predoped material is 100 mass %. In view of an anode capacity etc., in some embodiments, an anode active material may be no less than 90 mass %, may be no less than 93 mass %, and may be no less than 96 mass %; and a predoped material may be no more than 10 mass %, may be no more than 7 mass %, and may be no more than 4 mass %.

As is apparent from the results of Examples 1 to 8 and Comparative Example 1, when copper foil was used as the anode current collector, containing the predoped material in the anode mixture improved cycle characteristics of the sulfide solid-state battery.

Further, as is apparent from the results of Examples 6 and 7, the same effect was obtained even if the anode active material and/or the predoped material were/was changed.

Changing a material of an anode current collector to metal other than copper (such as stainless steel) as in Comparative Example 2 and Reference Example 1 also makes it possible to avoid CuS from forming, and to lower the self discharge. However, in this case, some properties of a battery other than the self discharge deteriorated. For example, as shown in Comparative Example 2, cycle characteristics of the battery deteriorate. As is apparent from the results of Comparative

TABLE 1

| | Weight of paste (mAh/g) | | | Predoped material | | Anode active material: predoped material | Converted value into capacity (X)/total capacity | Self discharge | Cycle retention |
|---|---|---|---|---|---|---|---|---|---|
| | Cathode | Anode | Anode active material | Kind | Charged capacity (mAh/g) | (mass ratio) | (Y) | ΔV (V) | (%) |
| Ex. 1 | 25 | 5.6 | Si | Graphite | 100 | 97:3 | 0.0008 | 0.18 | 86 |
| Ex. 2 | 25 | 5.6 | Si | Graphite | 100 | 99:1 | 0.0005 | 0.35 | 84 |
| Ex. 3 | 25 | 5.6 | Si | Graphite | 100 | 98:2 | 0.0007 | 0.29 | 85 |
| Ex. 4 | 25 | 5.6 | Si | Graphite | 100 | 96:4 | 0.0013 | 0.18 | 88 |
| Ex. 5 | 25 | 5.6 | Si | Graphite | 150 | 98.5:1.5 | 0.0008 | 0.18 | 86 |
| Ex. 6 | 25 | 5.6 | Si | LTO | 150 | 97:3 | 0.0008 | 0.17 | 85 |
| Ex. 7 | 25 | 2.7 | SiO | Graphite | 100 | 97:3 | 0.0010 | 0.18 | 92 |
| Ex. 8 | 25 | 5.6 | Si | Graphite | 10 | 70:30 | 0.0008 | 0.18 | 92 |
| Comp. Ex. 1 | 25 | 5.6 | Si | None | | 100:0 | 0 | 0.52 | 78 |
| Comp. Ex. 2 | 25 | 5.6 | Si | None | | 100:0 | 0 | 0.20 | 79 |
| Ref. Ex. 1 | 25 | 5.6 | Si | Graphite | 100 | 97:3 | 0.0008 | 0.17 | 80 |

As is apparent from the results shown in Table 1, containing the predoped material in the anode mixture led to outstanding reduction of the self discharge. The predoped material is believed to have made the initial anode potential of the sulfide solid-state battery lower, to suppress reaction of the copper foil and the sulfide solid electrolyte. While the amount of the predoped material contained in the anode mixture was not specifically limited and a certain effect was exerted if just a slight amount of the predoped material was contained in the anode mixture, from Examples 1 to 8, it can be said that the ratio (X/Y) of a converted value (X) obtained by converting the total amount of lithium with which the predoped material included in the anode mixture is being doped, into capacity, to the total capacity (Y) of the silicon-based active material contained in the anode mixture may be no less than 0.0005. Specifically, if X/Y is no less than 0.0008, when the self discharge is suppressed to be approximately 0.18 V is the limit of the effect of suppressing self-discharges. Or, from Examples 1 to 8, an anode active material may be no less than 70 mass % and less than 100 mass %, and a predoped material may be more than 0 mass % and no more than 30 mass %, if the total of the anode Example 2 and Reference Example 1, when stainless steel foil was used as the anode current collector, it was difficult to improve cycle characteristics even if the predoped material was contained in the anode mixture. This is believed to be because stainless steel foil is harder than copper foil, and thus is hard to follow expansion/contraction of an anode active material in charge/discharge.

From the above, it can be said that when an anode mixture layer containing a silicon-based active material and a sulfide solid electrolyte is provided over a surface of an anode current collector, it is advantageous to use the anode current collector containing copper, and then contain a predetermined predoped material in an anode mixture, to suppress formation of CuS, compared with using the anode current collector formed of material other than copper to avoid CuS from forming.

INDUSTRIAL APPLICABILITY

A sulfide solid-state battery produced according to the producing method of this disclosure may be used in a wide range of power sources such as a small-sized power source for portable devices and an onboard large-sized power source.

What is claimed is:

1. A method for producing a sulfide solid-state battery, the method comprising:
   a first step of doping at least one material selected from graphite and lithium titanate with lithium, to obtain a predoped material;
   a second step of mixing a sulfide solid electrolyte, a silicon-based active material, and the predoped material, to obtain an anode mixture; and
   a third step of layering the anode mixture over a surface of an anode current collector that contains copper, to obtain an anode,
   wherein a ratio (X/Y) of a converted value (X) to a total capacity (Y) is no less than 0.0005, the converted value (X) is a charge capacity of the predoped material, and the total capacity (Y) is a charge capacity of the silicon-based active material.

2. The method according to claim 1, wherein in the first step, said at least one material is doped with lithium using an electrochemical reaction in a lithium ion battery.

3. The method according to claim 1, wherein the ratio (X/Y) of the converted value (X) to the total capacity (Y) is no less than 0.0008.

* * * * *